Sept. 11, 1962 F. BUSSE 3,053,971
METHOD OF AND APPARATUS FOR MANUFACTURING HELICALLY FINNED TUBING
Filed Jan. 7, 1960 2 Sheets-Sheet 1

FERDINAND BUSSE,
INVENTOR.

BY Silverman, Mullin & Co.
ATT'YS.

Sept. 11, 1962            F. BUSSE            3,053,971

METHOD OF AND APPARATUS FOR MANUFACTURING HELICALLY FINNED TUBING

Filed Jan. 7, 1960            2 Sheets-Sheet 2

FERDINAND BUSSE,
INVENTOR.

BY Silverman, Mullin + Cass

ATT'YS.

_United States Patent Office_  3,053,971
Patented Sept. 11, 1962

3,053,971
METHOD OF AND APPARATUS FOR MANUFAC-
TURING HELICALLY FINNED TUBING
Ferdinand Busse, Hofmarkstrasse 29, Planegg,
near Munich, Germany
Filed Jan. 7, 1960, Ser. No. 1,012
12 Claims. (Cl. 219—107)

This invention concerns a method for the manufacture of helically finned tubing, in particular such but not exclusively, helically finned tubing as is used for heat exchangers in gas-cooled atomic power plants, wherein at least one U-sectioned strip, which constitutes the fins, is wound, under tension, continuously and helically onto a tube and is homogeneously united with the tube surface where it contacts the latter by electric resistance seam welding. The invention further concerns apparatus for carrying out said method.

This is a continuation-in-part application of my copending application Serial No. 718,037, filed February 27, 1958, for the invention entitled Method and Apparatus for Producing a Finned Tube, now Patent No. 2,965,744. In the co-pending application there is described a novel arrangement and method of resistance welding a U-shaped strip in a helical formation around a tube for the purpose of providing an improved heat exchange tube.

It is known, in the production of helically finned tubes, to wind profiled strips in one or more helices onto a tube and to unite the strips with the tube. Until now, the connection of strips to the tube has been achieved by means of shrinkage, autogenous welding, arc welding and the like. These methods do not permit of the production of homogeneous joint, between the strip and the tube, which guarantees a good heat transfer in the event that the finned tube is subjected to considerable fluctuations of temperature.

It is further known to wind a slitted profiled strip helically onto the tube and to connect it therewith by continuous electric resistance welding. Due to the heavy pressures involved and the fact that the heat generated is conducted to parts of the tube other than where welding is being effected, during the welding process, considerable difficulties arise. This is particularly the case if a thick profiled strip wound onto the tube in a helix of fine pitch is to be welded to the tube by conventional electric resistance welding. On the one hand undesirable deformation or distortion of the tube in the vicinity of the weld cannot be avoided. On the other hand, the electrodes will be worn away very quickly. In addition, the welding must be performed comparatively slowly.

For the manufacture of seamed tubes which are welded longitudinally along their seams using a high frequency electric current, it is known to apply the high frequency current at a point close to and in advance of the welding point by applying sliding contacts to the edges of a metal strip which is rolled to a tubular form having a longitudinal seam gap, and to force the longitudinal edges of the tube together at the welding point by means of pressure rollers. This known procedure, however, has been proposed only for the manufacturing of tubes from rolled metal strips.

It is an object of the present invention to provide method of and apparatus for manufacturing helically finned tubes whose thermal efficiency is as high as possible, wherein heavy strips may be used for the fins, and wherein the fins may be helically welded onto a cylindrical or like body in a simple manner avoiding the aforementioned disadvantages.

The method of the present invention is characterized in that alternating current of from one to several hundred kilocycles per second is fed to the strip and the surface of the tube, at a point close to and in advance of the welding point where the strip is to be welded to the tube, via contacts which are arranged in line.

Helically finned tubing with high thermal efficiency (for instance to be used as heat exchangers in gas-cooled atomic power plants) may be manufactured in accordance with the invention, both quickly and in a simple manner, even though the required dimensions of the fins, as to width (or spacing) and height, are such that they could not be used at all or only with great difficulty, using prior known methods for uniting them to the tube.

The present invention permits, further, manufacture of such finned tubes in a considerably shorter period of time than hitherto, because high frequency welding can be performed at a very high speed.

Through the use of the invention, finned tubing can be manufactured which is devoid of ridges, splutters and unevenness, thereby providing important heat exchange and other advantages, especially in atomic power plants.

According to a further feature of my invention those portions of the strip and the tube which are to be united by welding are heated by the alternating current of one to several hundred kilocycles per second to a temperature below welding temperature, and at the point of contact of the strip with the tube the latter are homogeneously welded by additional heating in a manner similar to known electric resistance welding which is based upon overcoming the contact resistance of the parts being welded.

In comparison to the first method of the invention this latter combined method has the advantage of easier adjustment and control of the welding speed.

The invention includes further apparatus for carrying the aforesaid methods in effect.

The invention will be described further, by way of example, with reference to the accompanying drawings, in which.

Figure 1:
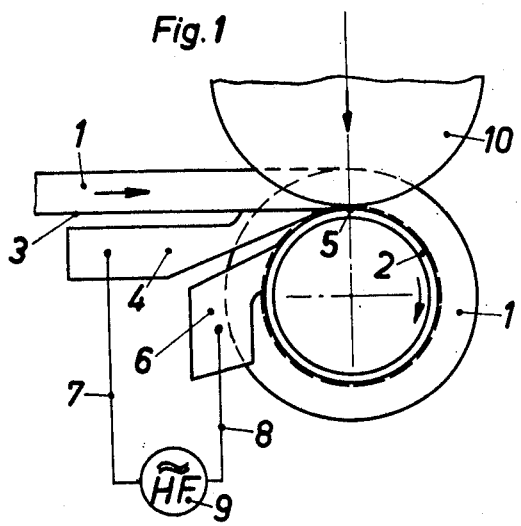
FIG. 1 is a diagrammatic end view of one practical form of apparatus for manufacturing of a finned tube using the method according to the present invention.

Referring to FIG. 1, for manufacturing a helically finned tube a U-sectioned deep-drawable strip 1 is drawn continuously off a roll (not shown in the drawings) and wound under tension onto a metal tube 2 in the form of a helix with close pitch. The pitch of the helix, the height of the limbs of the U and their spacing will be so chosen as to achieve the highest possible efficiency for the finished product.

One contact 4 is applied under pressure to the bottom face 3 of the strip and is shaped to extend as close as possible to the point 5 (hereinafter called "the welding point") where the strip 1 first meets the tube 2.

A second contact 6 is permanently pressed against a corresponding portion of the surface of the tube 2 and is likewise shaped to extend as close as possible to the welding point 5. The contacts 4 and 6 are connected by conductors 7 and 8 (schematically indicated in the drawing) to an alternating current generator 9, which supplies alternating current of at least one kilocycle and preferably, however, of four hundred to five hundred kilocycles per second.

With a suitable choice of frequency for the alternating current and appropriate density, the current carrying portions of the strip 1 and the tube 2 are heated to welding temperature on the surface only (skin-effect). Due to the tensile stress from the strip 1 which constantly affects the welding point 5, the strip 1 is continuously welded to the tube surface. Inasmuch as the heat does not penetrate very deeply into the tube, distortion or deformation of the tube is definitely avoided.

In addition to the tensile stress from the strip 1, a predetermined radial pressure can be applied upon the strip 1 at the welding point 5, by a pressure roller 10; said pressure roller 10, however, must be of a material of poor heat conductivity only, so that heat will be dissipated thereby as little as possible.

Figure 2:
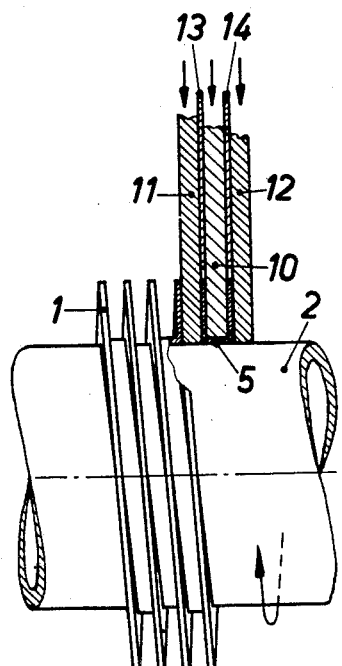
FIG. 2 is a diagrammatic part-sectional side elevation corresponding to FIG. 1.

As is apparent from FIG. 2, there are at both sides of the pressure roller 10 which engages the base of the U-sectioned strip 1 between the limbs of the U and presses it against the surface of the tube, forming discs 11 and 12 which are arranged to maintain the U-profile of the strip 1. Said forming discs abut the surface of the tube 1 and are rounded off at the circumferential edges. Inasmuch as their inner faces fit tightly against the outer faces of the limbs of the U-sectioned strip 1, the edges of the strip which are pressed outwards while the welding is being effected will be rounded. The forming discs 11 and 12 are secured to the pressure roller 10 with the interposition of intermediate discs 13 and 14 each of the same thickness as the limbs of the U.

Figure 3:
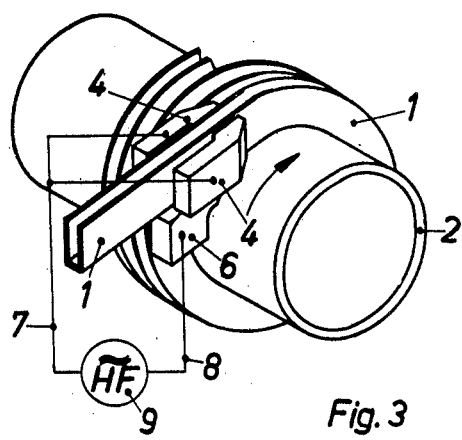
FIG. 3 is a perspective view showing a modified feed arrangement for the welding current.

In order to obtain a larger area of electrical current carrying contact at the strip 1, one or preferably two as shown in FIG. 3) strip-shaped contacts 4 which are connected in parallel, may be pressed against the outer faces of the U-limbs.

Figure 4:
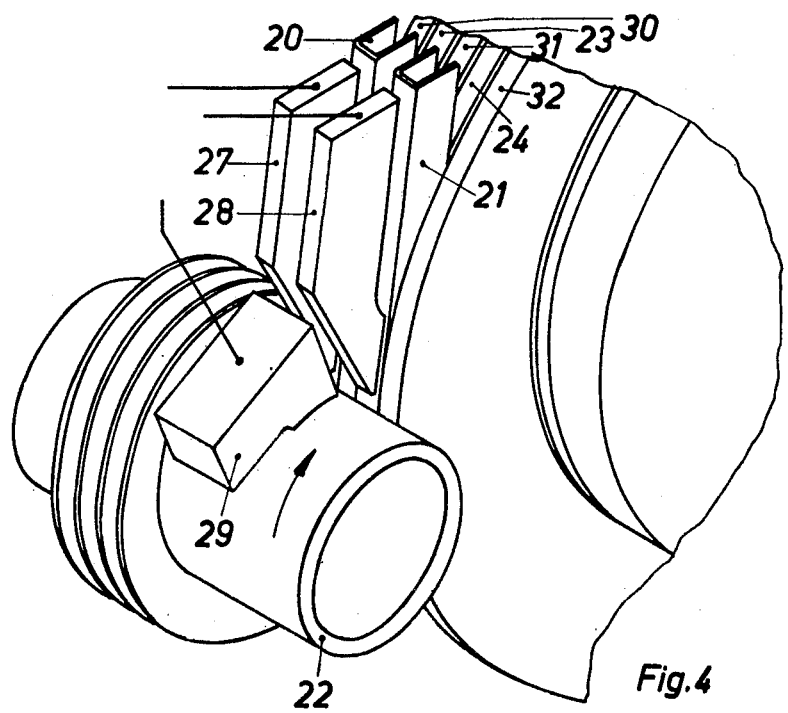
FIG. 4 is a fragmentary perspective view showing another form of apparatus for manufacturing finned tube using a modified or combined welding method according to the invention.
Figure 5:
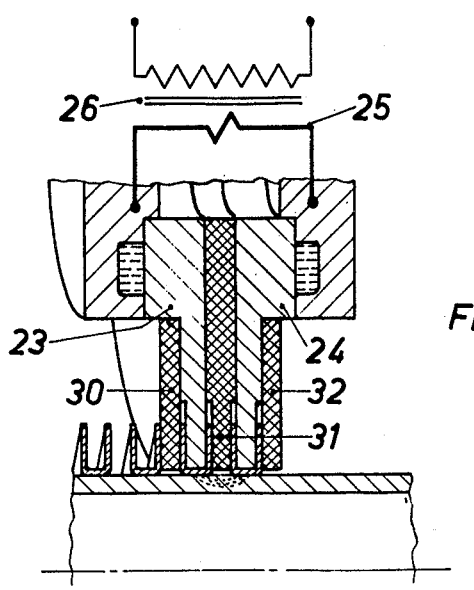
FIG. 5 is a diagrammatic longitudinal section of the arrangement of FIG. 4.

The above described method permits of a high welding speed. However, sometimes it may be difficult to adapt the movement of the tube and, thus, the welding speed to correspond. This obstacle can be overcome by heating those zones of strip and tube which are to be welded, by means of the alternating current of at least one kilocycle per second, to a temperature below the actual welding temperature only and also heating the welding point additionally by conventional electric resistance welding, which is based on overcoming the contact resistance. This combined welding method will now be described with reference to FIGS. 4 and 5.

In order to spare the contact rollers as is required for conventional resistance welding, at least two U-sectioned strips 20 and 21 are wound side-by-side simultaneously onto the tube 22. Electrode rollers 23 and 24 which are inserted between the limbs of the respective U's, and which force the U bases against the wall of the tube with a predetermined welding pressure, are connected to the secondary winding 25 of a welding transformer 26 which supplies, in known manner, welding current of, for instance, fifty cycles per second. The electric rollers 23 and 24 which are internally water-cooled and preferably, in addition, externally sprayed with water, serve simultaneously as electrode rollers and to effect welding of the two strips to the surface of the tube.

In order to pre-heat the strips and the corresponding portions of the tube in contact therewith, alternating current of at least one kilocycle per second is supplied to the strips through contacts 27 and 28 and to the wall of the tube through a contact 29. The width of the contact 29 corresponds to the area covered by two spaced strips 20 and 21 as wound on the tube.

For guiding the strips and maintaining the U-profile thereof, again forming discs 30, 31 and 32 of non-conducting material are provided, these being shaped to leave sufficient clearance for the limbs of the U's between the forming discs and the electrode rollers. Said forming discs may, also, engage the tube surface as shown and they will then be circumferentially rounded off, if the corners of the strips are intended to be rounded. In this instance, however, they must be yieldingly connected to the electrode rollers.

For adjustment of the welding temperature, the welding current can either be controlled automatically, preferably by photoelectric means, or by hand.

In order to achieve the highest possible thermal efficiency the fins ought to be spaced about 3 mm. apart, with a height of about 12 mm. For reason of stability the fins are preferably about 2 mm. thick. These values are merely stated by way of example.

Reference will be made herein to "high-frequency" heating current, and by this it will be intended to mean alternating current of such frequency, considering the type of material, that produces heating through "skin effect" as opposed to actual penetration of the metal.

I claim:

1. A method for manufacturing helically finned tubing which is to be used as heat exchange apparatus in which a least one U-shaped section metal strip is helically wound under tension upon a metal tube with its base engaged against the surface of the tube and its limbs comprising the fins and in which the said base is welded to the tube which comprises: continuously applying a high frequency alternating current to an exterior surface of the strip and an exterior surface of the tube immediately adjacent to and in advance of the location at which the strip and tube come together while the strip is being wound upon the tube whereby to homogeneously and continuously weld the strip to the tube.

2. A method as claimed in claim 1 in which simultaneously with the winding of the strip upon the tube and the application of high frequency current, the strip is radially pressed against tube at the said location.

3. A method as claimed in claim 1 in which simultaneously with the application of high frequency current, resistance welding current is also applied at said location.

4. A method as claimed in claim 3 in which the high frequency current is maintained at a value insufficient in and of itself to weld the strip to the tube whereby to lower the contact resistance of the said location to enable the resistance welding to proceed more readily.

5. A method as claimed in claim 1 in which there is a second strip of like configuration and both strips are wound upon the tube side by side and the high frequency alternating current is applied to an exterior surface of both strips and the adjacent exterior surface of the tube immediately adjacent to and in advance of the location at which the strips and tube come together.

6. A method of manufacturing helically finned tubing which is to be used as heat exchange apparatus in which at least one U-shaped section metal strip is helically wound under tension upon a metal tube with its base engaged against the surface of the tube and its limbs comprising the resulting fins, and in which the said base is welded to the tube, which comprises: continuously preheating the adjacent surfaces of the strip and tube immediately prior to the engagement of the strip with the tube as the strip is being wound upon the tube, and simultaneously resistance welding the strip and tube together at the location that they engage, thereby to provide a continuous homogeneous weld of the base of the strip to the surface of the tube along a helix.

7. A method as claimed in claim 6 in which a plurality of strips is wound upon and welded to the tube simultaneously.

8. The method of welding a U-shaped metal strip in a continuous helix upon a metal tube which comprises: winding the strip tightly upon the tube in a helical configuration with the base of the U flatly engaging the surface of the tube and the limbs radially extending outward of the tube to provide fin-like heat exchangers, confining the strip at the location of initial engagement with the tube to prevent distortion thereof, and applying high frequency electrical current to exterior surfaces of the strip and tube immediately adjacent said location and prior to the coming together of said strip and tube.

9. The method as claimed in claim 8 in which simultaneously with the application of high frequency electrical current, the base of the strip is pressed against the tube at said location of initial engagement.

10. Apparatus for welding a U-shaped metal strip upon a metal tube in a helix with the base of the U engaging the surface of the tube and the limbs of the strip forming radially extending helical fin-like heat exchange surfaces, comprising, means for rotating the tube thereby to advance said strip, means for guiding the strip, a source of high frequency current, one electrode engaging the tube surface immediately adjacent the location of initial engagement of the tube and strip and having a generally wedge shaped configuration extending in close proximity to said location, at least another electrode engaging an exterior surface of the strip and having a configuration to enable same to also extend in close proximity to said location whereby current flowing between said electrodes will be concentrated, and means connecting said source to said electrodes.

11. Apparatus as claimed in claim 10 in which pressure roller means are provided engaging between the limbs of said strip at the said location and pressing the strip against the tube, said pressure roller means being of low heat conductivity material.

12. Apparatus as claimed in claim 10 in which there is a second relatively low frequency current source, pressure roller means engaging against said strip, and said source is connected to said roller to effect the application of resistance welding current to said strip and tube through said roller means.

References Cited in the file of this patent

UNITED STATES PATENTS

| | | |
|---|---|---|
| 1,902,469 | Seede | Mar. 21, 1933 |
| 2,021,477 | Bohn | Nov. 19, 1935 |
| 2,174,928 | Riemenschneider et al. | Oct. 3, 1939 |
| 2,344,790 | Schryber | Mar. 21, 1944 |
| 2,747,064 | Pappelendam | May 22, 1956 |
| 2,821,619 | Rudd | Jan. 28, 1958 |
| 2,886,691 | Rudd | May 12, 1959 |

FOREIGN PATENTS

| | | |
|---|---|---|
| 1,188,690 | France | Mar. 14, 1959 |